United States Patent [19]
Von Stein

[11] Patent Number: 5,132,860
[45] Date of Patent: Jul. 21, 1992

[54] MAGNETIC MEDIA ERASURE SYSTEM

[76] Inventor: Paul W. Von Stein, 13015 Linden Church Rd., Clarksville, Md. 21029

[21] Appl. No.: 421,497

[22] Filed: Oct. 13, 1989

[51] Int. Cl.$^5$ .................. G11B 5/325; G11B 5/03; H01H 47/00

[52] U.S. Cl. ..................... 360/118; 360/66; 361/151

[58] Field of Search .............. 360/66, 118; 361/151

[56] References Cited

U.S. PATENT DOCUMENTS

| | | | |
|---|---|---|---|
| 4,146,956 | 4/1979 | Fujiwara | 360/118 |
| 4,218,722 | 8/1980 | Yoshizawa | 361/151 |
| 4,423,460 | 12/1983 | Jackson et al. | 361/151 |
| 4,462,055 | 7/1984 | Jackson et al. | 360/118 |
| 4,467,389 | 8/1984 | Knipp | 361/151 |
| 4,613,919 | 9/1986 | Miyatake et al. | 360/118 |
| 4,956,728 | 9/1990 | Hayata et al. | 360/66 |
| 5,043,959 | 8/1991 | Minami et al. | 360/66 |

Primary Examiner—A. J. Heinz
Assistant Examiner—Jefferson Evans
Attorney, Agent, or Firm—Saul Elbaum; Jason M. Shapiro

[57] ABSTRACT

An erasure system for magnetic information storage media is disclosed by which magnetic media, such as computer, video and audio tapes, cassettes and discs, can be thoroughly erased. The system uses high energy product permanent magnets preferably positioned so that their poles repel one another to induce "bucking magnetic fields" having lines of force active in the three spatial planes and parallel or tangential to the recorded signal track on the media being erased. The DC magnetic field thus applied causes the DC erasure of the media. The AC erasure effect comes about through the relative movement of the media through fixed magnetic fields of opposite polarity, causing the magnetic media to be subjected to a reversing polarity of magnetic saturation. The magnet configurations can be adjusted for use on helically recorded magnetic media, in addition to cross-field and conventional recording techniques.

12 Claims, 6 Drawing Sheets

MAGNETIC MEDIA ERASURE SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention generally relates to the erasure of information from magnetic storage media systems, both analog and digital types and, more particularly, to magnetic media erasure systems for achieving sufficiently deep AC and/or DC erase to facilitate declassification of U.S. Government classified magnetic media of the high coercivity type.

It is known that DC erasure is necessary prior to AC degaussing to successfully erase National Security Agency Class II or higher coercivity magnetic media. AC degaussing alone will not suffice. Further, it is known that erasure in as many spatial planes as possible (normal, transverse and longitudinal) facilitates erasure of the primary signal and its harmonics to optimum depths. However, existing NSA Class I AC Degausser systems have proven unsatisfactory on high coercivity media, on the order of 750 Oersteds or more, in achieving the minimum targeted bulk erase level of −90 dB below signal saturation that has been set for the declassification of classified magnetic media.

BRIEF SUMMARY OF THE INVENTION

The magnetic media erasure system in accordance with the present invention overcomes the above difficulties by providing at least one pair of magnets, preferably Neodymium Iron Boron alloy, having poles of the same polarity disposed opposite each other so that a "bucking field" is induced. The DC magnetic field thus produced causes the DC erasure of media passed thru the gap between the magnets so that it can now be successfully erased by a Class I degausser. However, an AC erasure effect can be brought about through the relative movement of the media through 2 or more opposite polarity fixed fields. In the case of audio tapes, this movement may be provided by any number of methods, such as passing the tape past magnets disposed between the reels of a reel-to-reel tape machine, by rubbing a magnet block along the tape, by winding the tape onto an empty reel while a small horse-shoe shaped magnet inserted between the sides outward on the accumulating tape, or rotating a magnetic block relative to the tape, or the like. Alternatively, the magnetic media may be dropped through the bucking field. This latter method is particularly useful for the emergency destruction of magnetic media of all types except computer disk packs. For computer disk packs, a wand having magnets of opposite polarity attached to a handle, preferably teflon coated to avoid damaging the magnetic media, may be inserted into the computer disk pack and wiped across the disk surfaces to achieve both DC and AC erase.

Various magnet configurations for generating the desired fields are disclosed. Using a magnetic media erasure system in accordance with the invention, DC erasure to at least −74 dB below the signal saturation level can be consistently achieved, and with some configurations, DC erasure to the NSA standard for declassification of −90 dB below the signal saturation level or better has been achieved.

DETAILED DESCRIPTION OF THE PREFERRED EMBODIMENTS

Figure 1:
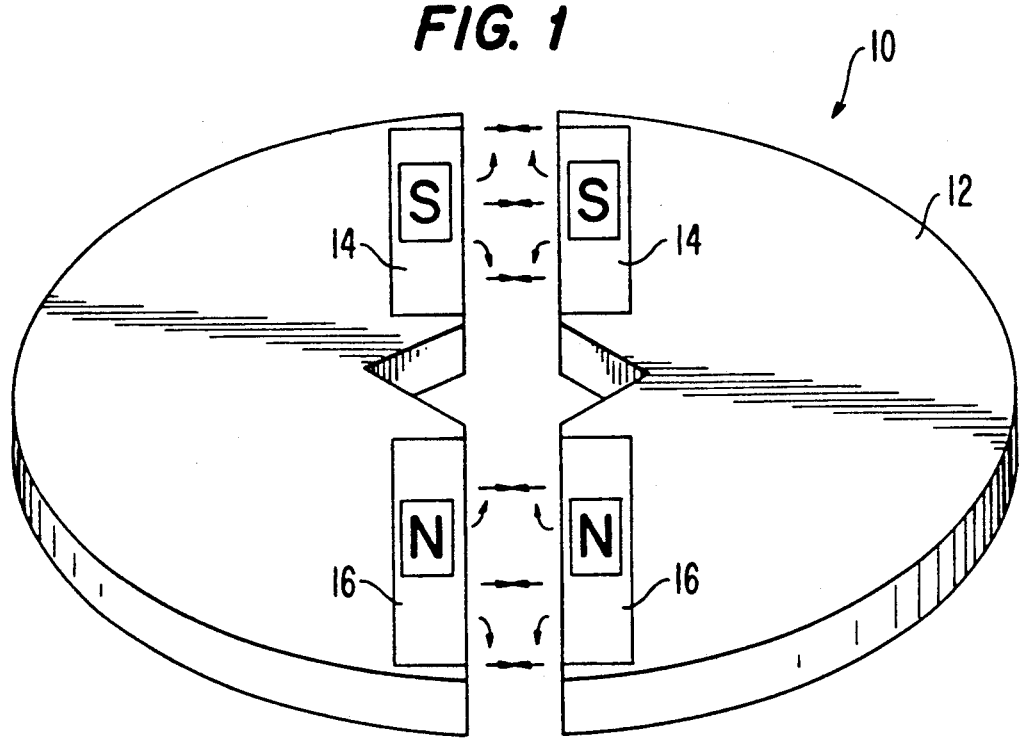
FIG. 1 is a perspective view of magnetic media erasure system in accordance with a preferred embodiment of the present invention.

A magnetic media erasure system in accordance with a first embodiment of the present invention is shown in FIG. 1 and generally designated 10. Throughout the figures, like numerals are used to represent like elements.

Figure 4A:
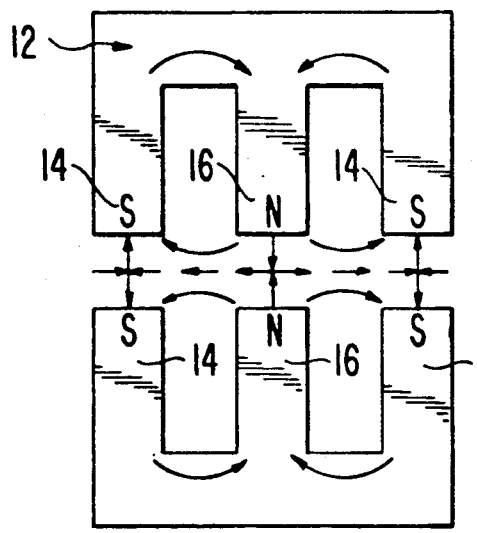
FIG. 4A is a top planar view showing the bucking field lines of one configuration for DC and AC erase.
Figure 4B:
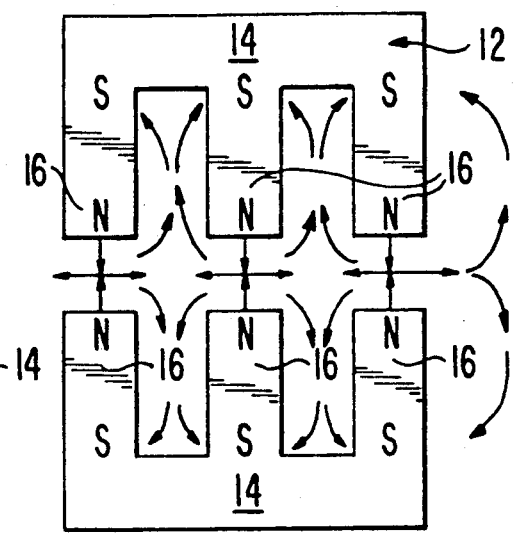
FIG. 4B is a top planar view showing the bucking field lines of one configuration for DC erase only.

System 10, as shown in FIGS. 1 and 4A, includes special high energy permanent magnet 12 having mutually repelling poles 14, 14 and 16, 16 located opposite one another. The magnets used throughout the various embodiments of the present invention are preferably made of rare-earth/iron alloys, such as the Neodymium/Boron/Iron magnet sold by Crucible Materials Corporation of Elizabethtown, Kentucky, under the trade name "Crumax 355", or any even stronger permanent magnet.

The "bucking field" induced by opposing, similar magnetic poles 14, 14 and 16, 16 creates a high energy flux pattern that washes all three spatial planes (normal, transverse and longitudinal) within the magnetic media passed thru it. This effect is not possible when using an attracting field (a north pole opposing a south pole), since such a field passes straight through the pole gap undeflected, causing erasure in only the transverse plane. However, a system utilizing mutually repelling poles as in the present invention causes the magnetic flux lines to collide in the center of the gap and to move away at right angles from the straight line separation of the poles, causing erasure in both the transverse and longitudinal or transverse and normal planes or portions of all three planes. As can be seen from the above, the specific type of erasure thus depends solely on the orientation of the magnets relative to the magnetic media. Hence, a unit magnetic pole within the media would, theoretically, achieve erasure in all three spatial planes, as it passes through this type of field.

AC erasure may be affected without the use of electric power by relative movement of the magnetic media through fixed magnetic fields of opposite polarity created by permanent magnets (not wire coils), causing the media to experience a reversing polarity of magnetic saturation. The cyclic rate of reversal is dependent upon the speed of movement of the media through the stationary fields. Thus, a series of alternating magnetic poles such as shown in FIG. 3 and 4A could produce both AC and DC erasure.

Figure 3:
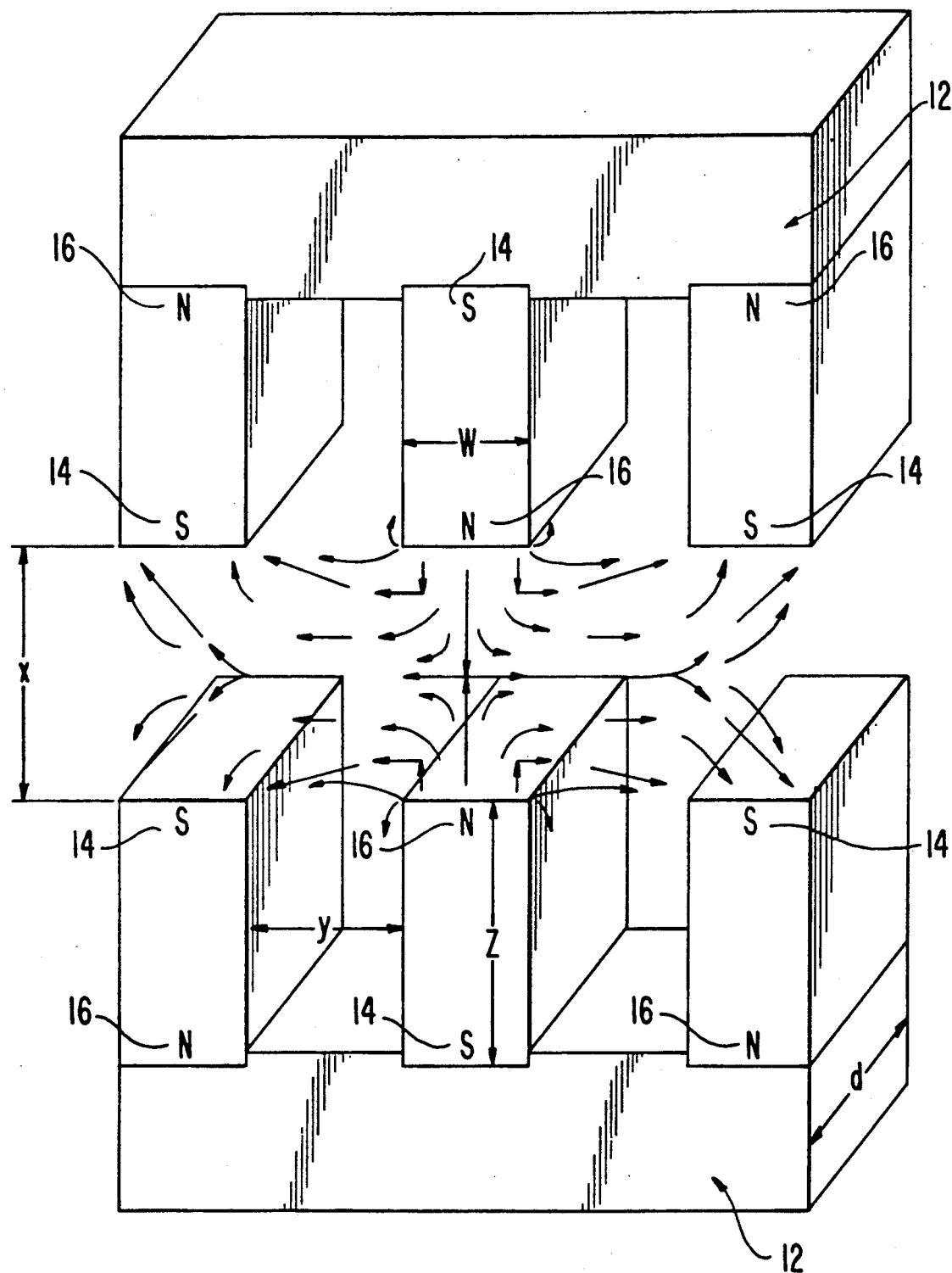
FIG. 3 is a perspective view showing the bucking field generated by one configuration of three-pole magnets in accordance with another preferred embodiment of the present invention.

As shown in FIG. 3, the magnets 12 are preferably separated by a distance x, the width of the object to be erased by the particular device. The magnet poles preferably have a width $w \geq 2x$, a depth $d =$ approximately 20% more than the object to pass under, and a length $z \geq x$. Adjacent poles are separated by a distance $y \geq x$. The degree of flux penetration in the normal spatial plane has been found to be highly dependent on the w, z and d dimensions.

Figure 2:
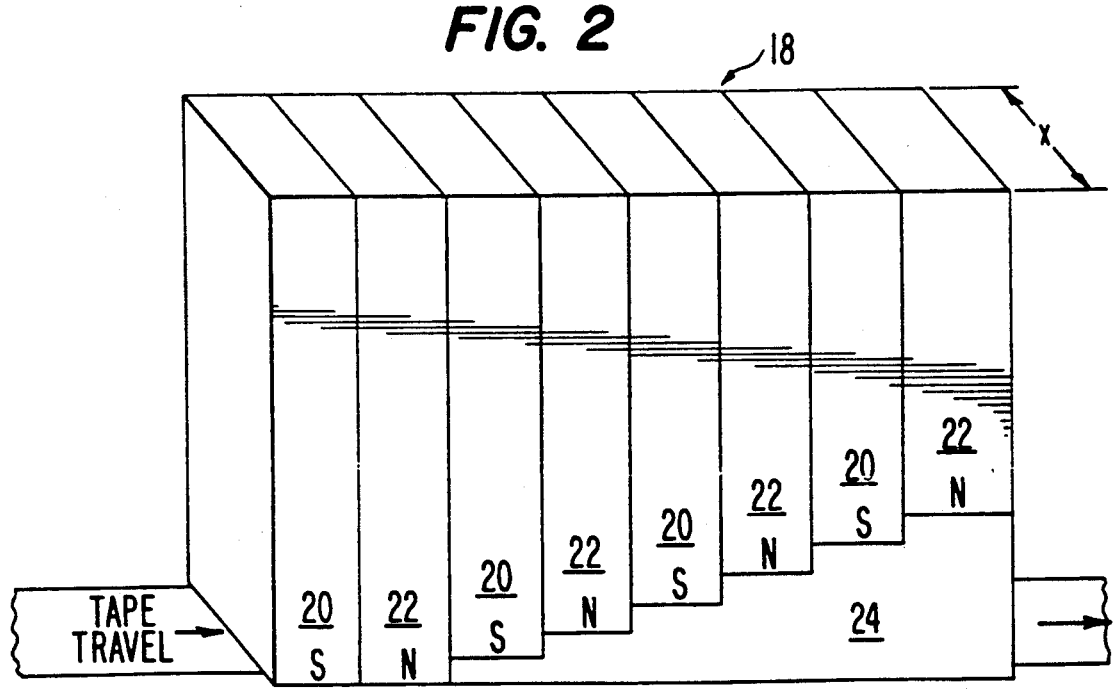
FIG. 2 is a perspective view of a magnetic media erasure system using stepped magnet pole segments in accordance with a further preferred embodiment of the present invention.

One preferred configuration of such a system utilizing a series of magnets is shown in FIG. 2. The system utilizes a magnet block 18 of width x, preferably at least 25% wider than the tape, having alternating North and South pole segments 20, 22 disposed along the direction of travel of a magnetic tape and in close proximity to it. The length of the magnet segments gradually decreases to create a "stepped" magnet of gradually diminishing intensity at the tape plane, with a spacer 24 filling the stepped gap formed between the lower edge of the segments and the lower edge of the magnet block 18 which establishes the plane of the tape. The step distances will vary, depending on the tape coercivity, to achieve maximum reduction in signal to noise ratio.

Figure 5:
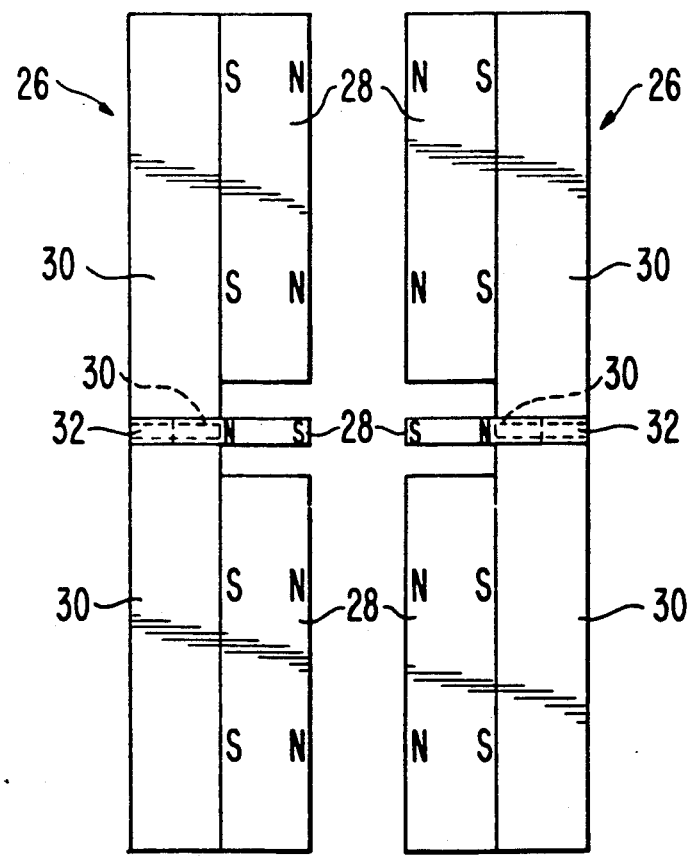
FIG. 5 is a side elevational view of a system in accordance with another preferred embodiment of the present invention using relative rotation between the magnets and the magnetic media.

In another preferred embodiment shown in FIG. 5, the system may be adapted to be rotated relative to the magnetic media, although in practice it may be desirable to move the media rather than the magnets. In this embodiment, the system includes a pair of cross-shaped magnet blocks 26 formed by radially extending arms 30. Each magnet block 26 includes a magnet 28 attached in a suitable manner to each radially extending arm 30. While only six magnets 28 can be seen in this view, it is understood that eight magnets are required for symmetry and balance. Variations could use a total of 4 or 16 magnets or the like. In the preferred embodiment, the arms are formed of magnetic steel plates or the like.

A central spindle shaft hole 32 is formed in each of the magnet blocks 26 to permit the magnet blocks to rotate relative to the magnetic media. A standard drive mechanism, either manual or powered, (not shown) may be coupled to a drive spindle (not shown) fitted within shaft hole 32 to effect rotation of the magnet block. A peripheral drive could also be used. The polarity of the magnets alternates from arm to arm so that the desired reversing polarity discussed above for AC erasure can be obtained. More complex eraser is also possible when the blocks 26 rotate at different speeds since this will provide North to South polarization in addition to the bucking fields.

Figure 6:
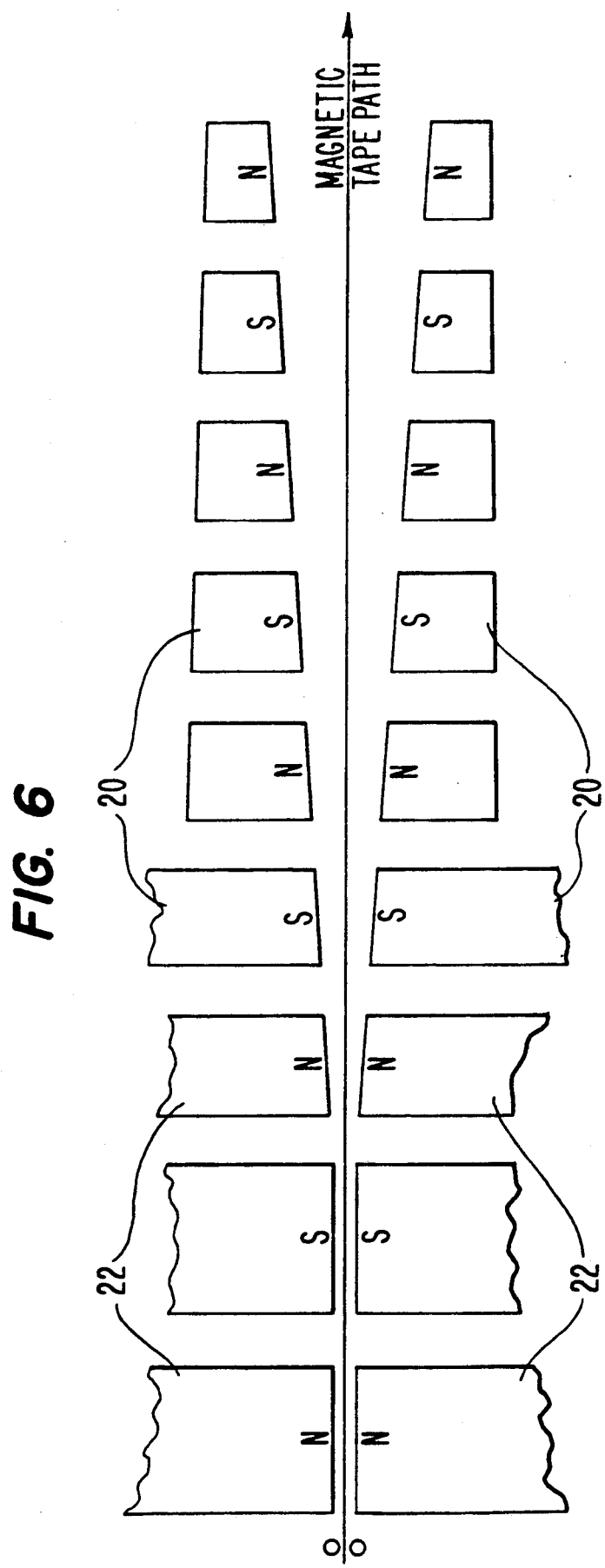
FIG. 6 is a planar top view of a system similar to that shown in FIG. 2, except that the magnet blocks are disposed on either side of the magnetic media, as are the heads in cross-field recording.

The embodiment illustrated in FIG. 6 is substantially the same as that shown in FIG. 2, except that the magnet pole segments 20, 22 are arranged on both sides of the magnetic media. As in the embodiment illustrated in FIG. 2, the rate of magnetic flux decrease due to the separation distance is dependent on the coercivity of the tape to be erased and the acceptable signal to noise ratio. The arrangement shown in FIG. 6 is particularly useful for erasing tapes that are recorded using heads placed adjacent both the upper and lower sides of the tape so that the information is recorded in a direction normal to the tape.

Figure 7:
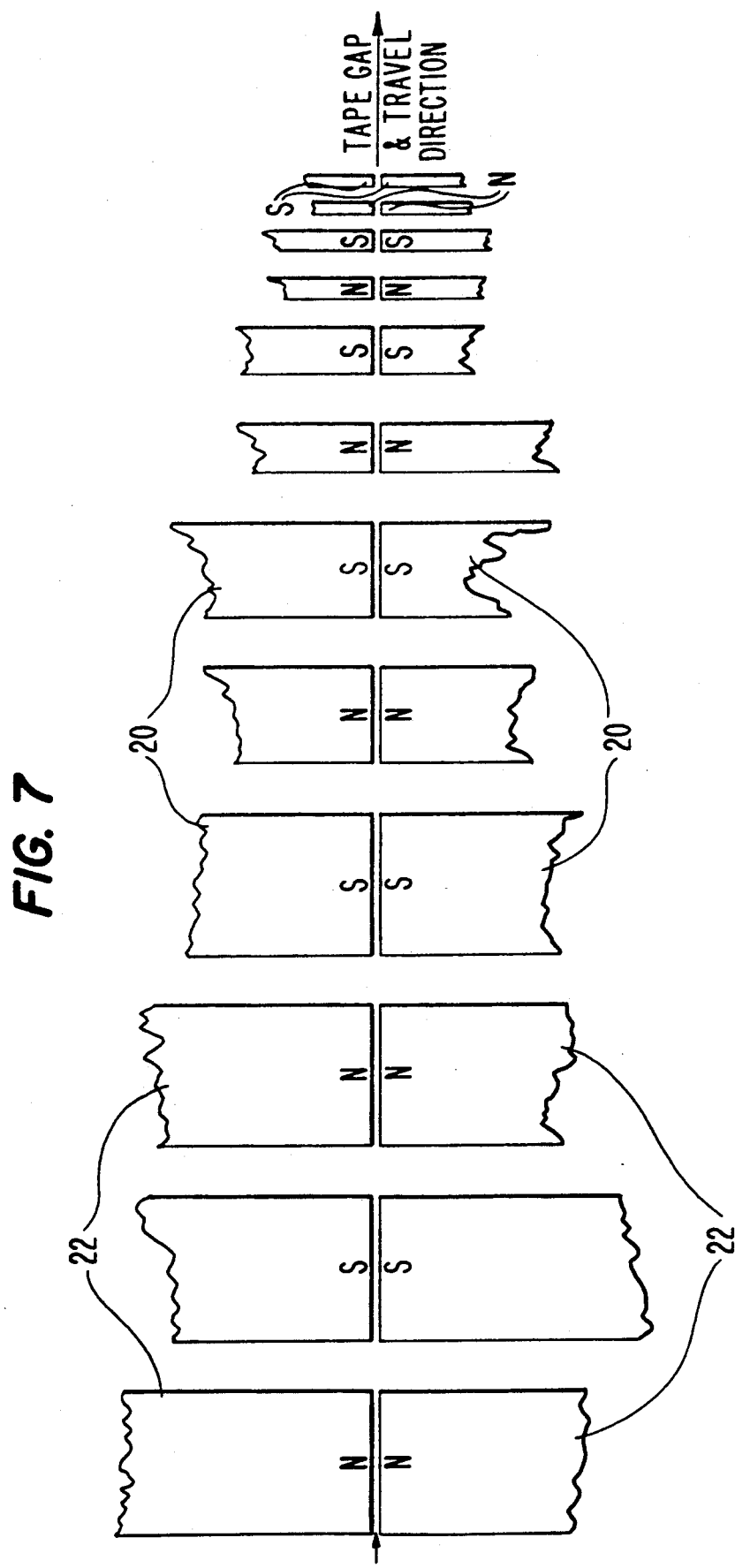
FIG. 7 is a planar top view of a system similar to that shown in FIG. 6, except that instead of increasing the spacing between the tape and magnet poles, gradually weaker magnets are employed.

Alternatively, instead of using stepped segments to increase the tape gap between the magnet blocks, as shown in FIG. 6, the same reduction in field density can be obtained by decreasing the strength of the magnet pole segments along the direction of tape travel, as shown in FIG. 7, by either reducing pole area or selecting lower energy magnets or both.

The magnet pole segments shown in FIGS. 6 and 7 are preferably encased in plastic with a tape slot provided for accommodating passage of the tape therethrough. The entry gap width of the slot is preferably no greater than 1 ½ times that of the tape thickness to provide tolerance for the tape. Instead of encasing the magnet pole segments in plastic, guide posts may be formed at each end of the tape path to ensure proper alignment of the tape relative to the magnets.

Figure 8:
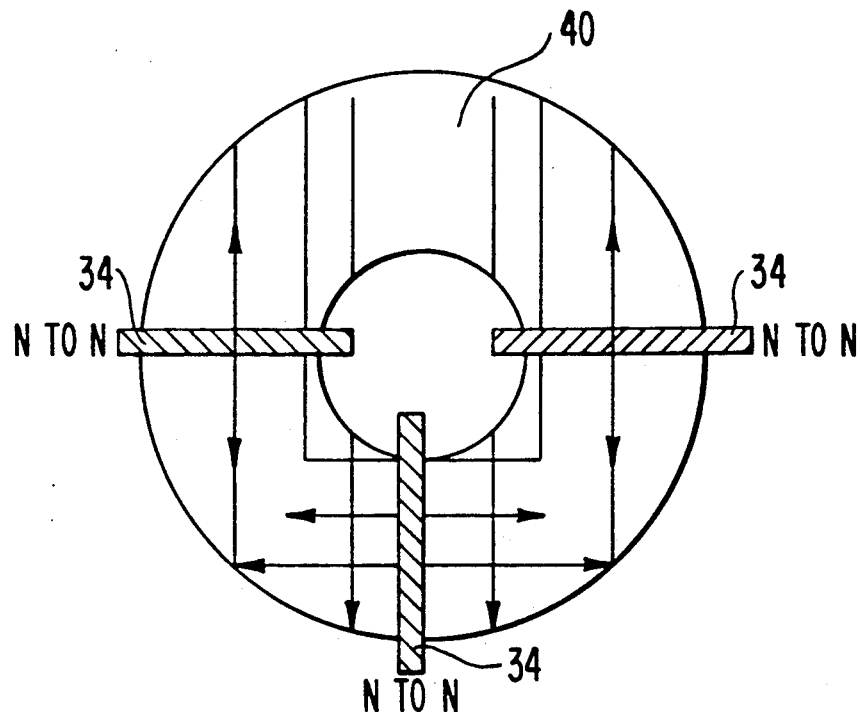
FIG. 8 is a side elevational view of a "drop thru" system in accordance with a further embodiment of the present invention.
Figure 9:
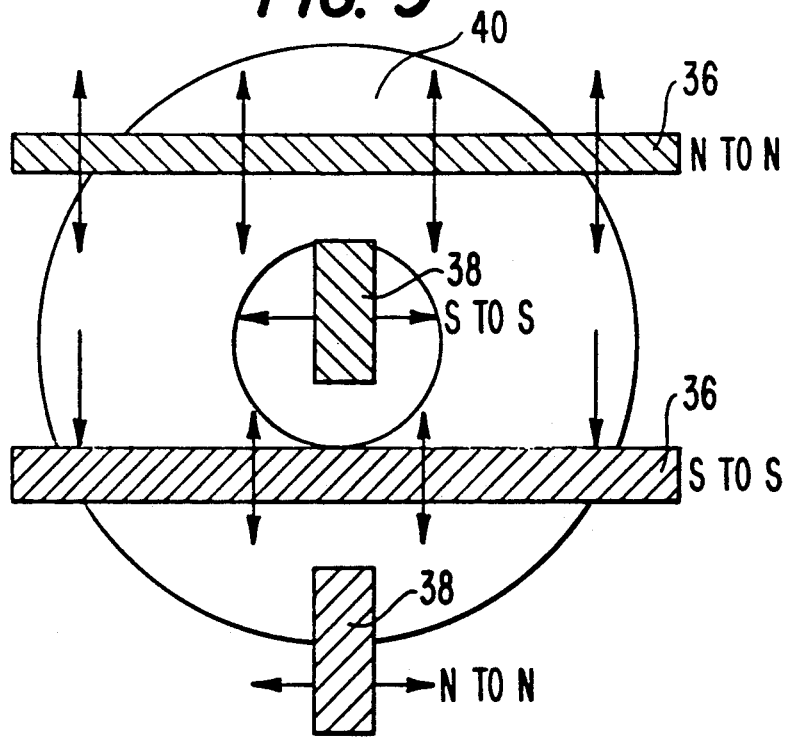
FIG. 9 is a side elevational view of another "drop thru" system in accordance with a further embodiment of the present invention.

FIGS. 8 and 9 illustrate "drop-thru" systems in which a computer disk 40 or other magnetic media such as tapes and cassettes may be dropped past the magnets to achieve erasure. In the embodiment illustrated in FIG. 8, several layers of magnet pole segments 34 (only one is shown) may be used to achieve varying levels of DC erasure. The embodiment illustrated in FIG. 9 may utilize several layers of alternating North and South magnet pole segments 36, 38 (again, only one layer is shown) to achieve varying levels of AC erasure as well as DC erasure, according to the mechanism discussed previously with respect to the other embodiments.

The foregoing is for illustrative purposes only. Modifications can be made, particularly in size, shape and arrangement of parts, in accordance with the scope of the invention as defined by the appended claims. For example, the magnet configurations of the system can be adjusted to accommodate helically recorded magnetic media.

What is claimed is:

1. A magnetic media erasure system, said system comprising:
    two magnetic blocks, each of said blocks having at least one substantially planar surface positioned such that it faces, and is parallel to, a planar surface on the other block, both of said surfaces being referred to as inner faces;
    a plurality of permanent magnets disposed radially upon the inner faces of said blocks in a circumferential fashion, wherein corresponding magnets on opposite faces are of the same polarity, thereby repelling each other, and wherein circumferentially adjacent magnets on the same face are of opposite polarity, a magnetic media being disposed between said blocks, parallel to said inner faces, and in close proximity to said magnets attached thereto;
    means to produce relative motion between said magnetic media and said blocks, wherein said blocks can remain stationary while said magnetic media is in motion, or said blocks can rotate synchronously or non-synchronously while said magnetic media remains stationary;

whereby AC and DC type degaussing of the magnetic media is induced, and a signal reduction of greater than 90 dB can be achieved with 750 Oersted coercivity magnetic recording media.

2. A magnetic media erasure system as in claim 1, which overcomes the inherent DC erase problem of leaving behind even signal harmonics, by using a square wave erase pattern generated by said permanent magnets, which are capable of asymptotic signal saturation of the media.

3. The invention of claim 1 or 2 wherein the distance between said blocks is adjustable to accommodate magnetic media of different sizes.

4. An apparatus for erasing magnetic media, said apparatus comprising:
  a first magnetic erase head which comprises a series of radially arranged poles of alternating polarity;
  a second magnetic erase head which is identical in structure to the first;
  means to position said magnetic erase heads on opposite sides of said magnetic media such that poles of like polarity are disposed opposite one another, and the magnetic fields associated with said poles are of sufficient strength to induce asymptotic signal saturation of the magnetic media.

5. The invention of claim 4 wherein said magnetic poles are arranged circumferentially on said magnetic erase heads.

6. The invention of claim 5 wherein means are provided to induce rotation of said magnetic media between said magnetic erase heads.

7. The invention of claim 5 wherein means are provided to induce synchronous rotation of said magnetic erase heads about the same axis.

8. The invention of claim 5 wherein means are provided to induce asynchronous rotation of said magnetic erase heads about the same axis.

9. A method of bulk erasing high coercivity magnetic recording media, said method comprising the steps of:
  (a) positioning a reel of high coercivity magnetic tape between two magnetic erase heads, such that all recorded portions of said tape pass between said erase heads when said reel is rotated, each of said erase heads comprising a series of magnetic poles of alternating polarity arranged radially and in a circumferential fashion about said erase head, wherein poles of like polarity on opposing erase heads are disposed opposite one another, and the magnetic fields associated with said poles are of sufficient strength to induce asymptotic signal saturation of the magnetic media;
  (b) rotating said high coercivity magnetic tape between said erase heads to accomplish DC and AC type erasure.

10. A method of bulk erasing high coercivity magnetic recording media, said method comprising the steps of:
  (a) positioning a reel of high coercivity magnetic tape between two magnetic erase heads, such that all recorded portions of said tape pass between said erase heads when said reel is rotated, each of said erase heads comprising a series of magnetic poles of alternating polarity arranged radially and in a circumferential fashion about said erase head, wherein poles of like polarity on opposing erase heads are disposed opposite one another, and the magnetic fields associated with said poles are of sufficient strength to induce asymptotic signal saturation of the magnetic media;
  (b) rotating said erase heads synchronously about a common axis to accomplish DC and AC type erasure of the high coercivity magnetic tape disposed between said erase heads.

11. A method of bulk erasing high coercivity magnetic recording media, said method comprising the steps of:
  (a) positioning a reel of high coercivity magnetic tape between two magnetic erase heads, such that all recorded portions of said tape pass between said erase heads when said reel is rotated, each of said erase heads comprising a series of magnetic poles of alternating polarity arranged radially about said erase head, wherein poles of like polarity on opposing erase heads are disposed opposite one another, and the magnetic fields associated with said poles are of sufficient strength to induce asymptotic signal saturation of the magnetic media;
  (b) rotating said erase heads asynchronously about a common axis to accomplish DC and AC type erase of the high coercivity magnetic tape disposed between said erase heads.

12. A method of bulk erasing magnetic recording media, said method comprising the steps of:
  (a) positioning two magnetic erase heads such that said magnetic recording media can pass between said erase heads, wherein each of said erase heads comprises a series of magnetic poles of alternating polarity arranged radially and in a circumferential fashion about said erase head, wherein poles of like polarity on opposing erase heads are disposed opposite one another, and the magnetic fields associated with said poles are of sufficient strength to induce asymptotic signal saturation of the magnetic media passing therebetween;
  (b) dropping said magnetic recording media between said erase heads to accomplish DC and AC type erasure.

* * * * *